United States Patent
Danilchenko et al.

(10) Patent No.: US 11,888,998 B2
(45) Date of Patent: Jan. 30, 2024

(54) SECURITY CONTEXT DISTRIBUTION SERVICE

(71) Applicant: Schneider Electric USA, Inc., Andover, MA (US)

(72) Inventors: Victor Danilchenko, South Hadley, MA (US); Daniel Cohen, Newtonville, MA (US)

(73) Assignee: Schneider Electric USA, Inc., Boston, MA (US)

( * ) Notice: Subject to any disclaimer, the term of this patent is extended or adjusted under 35 U.S.C. 154(b) by 423 days.

(21) Appl. No.: 17/292,604

(22) PCT Filed: Jan. 29, 2020

(86) PCT No.: PCT/US2020/015667
§ 371 (c)(1),
(2) Date: May 10, 2021

(87) PCT Pub. No.: WO2020/160139
PCT Pub. Date: Aug. 6, 2020

(65) Prior Publication Data
US 2021/0409232 A1 Dec. 30, 2021

Related U.S. Application Data

(60) Provisional application No. 62/826,397, filed on Mar. 29, 2019, provisional application No. 62/798,202, filed on Jan. 29, 2019.

(51) Int. Cl.
*H04L 9/32* (2006.01)
*H04L 9/08* (2006.01)
(Continued)

(52) U.S. Cl.
CPC .......... *H04L 9/3268* (2013.01); *H04L 9/0891* (2013.01); *H04L 9/0894* (2013.01);
(Continued)

(58) Field of Classification Search
CPC .................................................. H04L 9/3268
See application file for complete search history.

(56) References Cited

U.S. PATENT DOCUMENTS

| 9,699,655 | B1 | 7/2017 | Silas | |
|---|---|---|---|---|
| 2007/0180229 | A1* | 8/2007 | Salowey | ............... H04L 9/3263 713/173 |

(Continued)

FOREIGN PATENT DOCUMENTS

| EP | 1436682 B1 | 9/2015 | |
|---|---|---|---|
| KR | 20160100410 A | 8/2016 | |
| WO | WO-0122242 A1 * | 3/2001 | ............. G06F 21/10 |

OTHER PUBLICATIONS

Victor Danilchenko et al., "Bootstrapping security configuration for IoT devices on networks with TLS inspection," 2019 IEEE Globecom Workshops, XP033735036, Dec. 9, 2019, 7 pages.

(Continued)

*Primary Examiner* — Ponnoreay Pich
(74) *Attorney, Agent, or Firm* — Locke Lord LLP

(57) ABSTRACT

Techniques for configuring a device with a security context using a security context distribution service are provided. One embodiment receives, from a first device operating on a first network, a request for a security context for the first device, where the request includes a public certificate for the first device. The request is decrypted, and the public certificate is validated. A set of device requirements are determined based on a unique identifier for the first device and device claim information associated with the first device. Embodiments generate a response message that contains at least one Transport Layer Security (TLS) certificate associated with the first network, based on the set of device requirements, where the response message is encrypted (Continued)

using a public key associated with the first device. The response is message is transmitted to the first device.

23 Claims, 15 Drawing Sheets

(51) Int. Cl.
  *H04L 9/14* (2006.01)
  *H04L 9/40* (2022.01)
(52) U.S. Cl.
  CPC .............. *H04L 9/14* (2013.01); *H04L 9/3247* (2013.01); *H04L 63/0442* (2013.01)

(56) References Cited

U.S. PATENT DOCUMENTS

| | | | |
|---|---|---|---|
| 2018/0191508 A1* | 7/2018 | Scriber | G06Q 20/102 |
| 2019/0320320 A1* | 10/2019 | Li | H04L 9/0838 |
| 2019/0356482 A1* | 11/2019 | Nix | H04W 12/041 |
| 2020/0322332 A1* | 10/2020 | Haque | H04L 63/0442 |
| 2021/0409232 A1* | 12/2021 | Danilchenko | H04W 12/043 |

OTHER PUBLICATIONS

Extended European Search Report dated Jul. 4, 2022 for corresponding European Patent Application No. 20747809.0-1218, 9 pages.
International Search Report and Written Opinion dated Apr. 8, 2020 for PCT/US2020/15667, 9 pages.

* cited by examiner

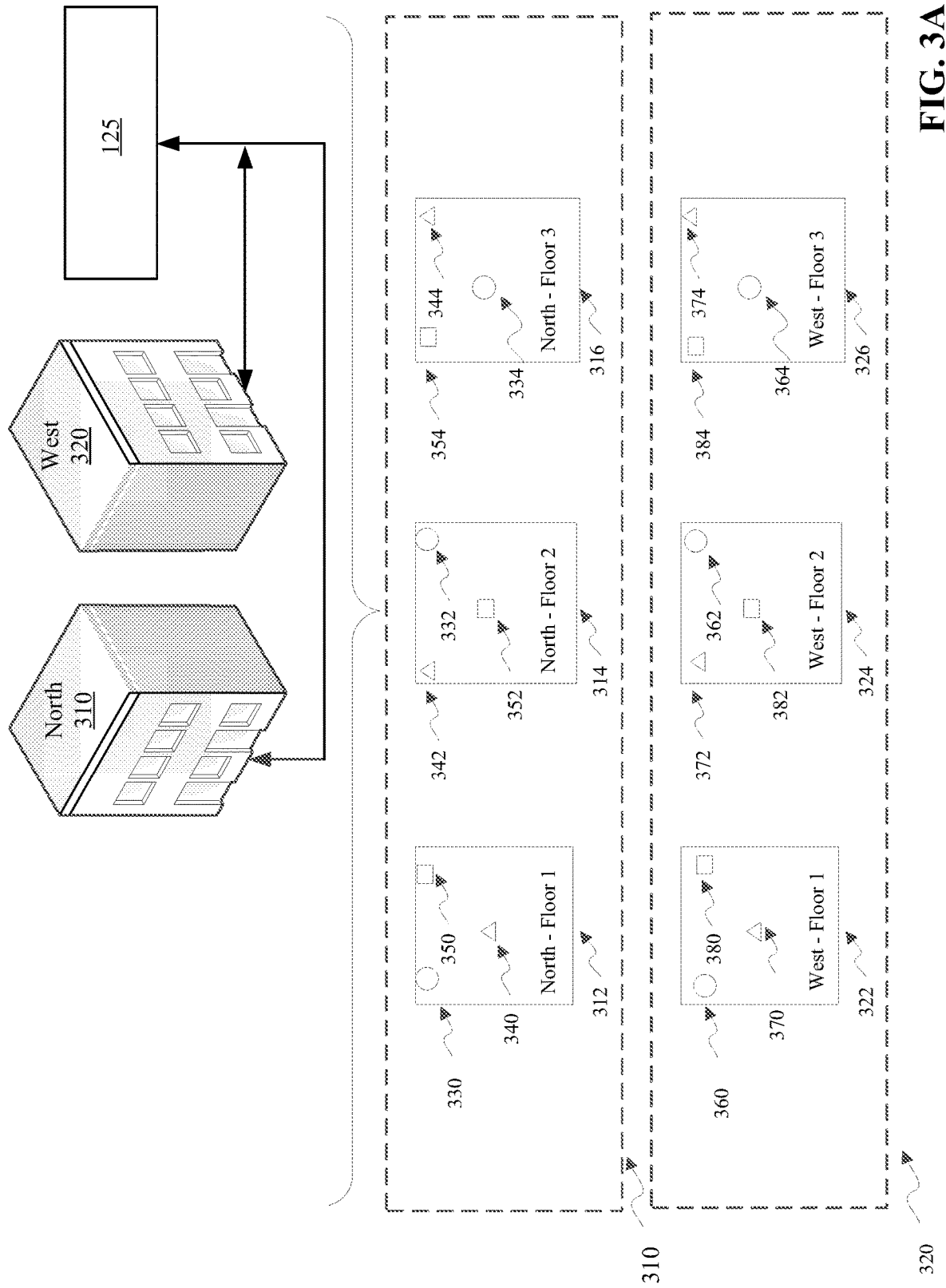

Pre-Customization

Post-Customization

SECURITY CONTEXT DISTRIBUTION SERVICE

TECHNICAL FIELD

The present disclosure relates to computer networking, and more particularly, to a security context distribution service for automatically devices with the appropriate security contexts to operate within a particular data communications network.

BACKGROUND

The Internet of Things (IoT) promises to interconnect devices and systems together on a massive scale. Such amalgamation allows interactions and collaborations between these elements in order to fulfill one or more specific tasks. Such tasks may differ according to the context and environment of application. For example, tasks may range from sensing and monitoring an environmental characteristic such as temperature or humidity of a single room to controlling and optimizing an entire building or facility to achieve a larger objective such as an energy management strategy. In a variety of these environments, securing the data transacted by these IoT devices is highly beneficial.

IoT devices are generally constrained in terms of their computing resources, such as storage, CPU, and/or memory. Even if such devices are not resource-constrained, it may be beneficial to avoid complexity and management overhead of integrating IoT device management into a larger environment. Such devices also may be placed in a variety of connectivity contexts which may make conventional cloud connectivity problematic absent additional configuration. While conventional solutions allow for the manual configuration of these IoT devices, such manual configuration is inefficient and may be impractical when dealing with many IoT devices. As such, a security challenge exists for IoT devices which do not commonly apply to conventional computing devices and systems.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

FIGS. 3A-B illustrate exemplary deployments of various connected elements of a SCDS, according to embodiments described herein.

Identical reference numerals have been used, where possible, to designate identical elements that are common to the figures. However, elements disclosed in one embodiment may be beneficially utilized on other embodiments without specific recitation.

SUMMARY

Figure 1:
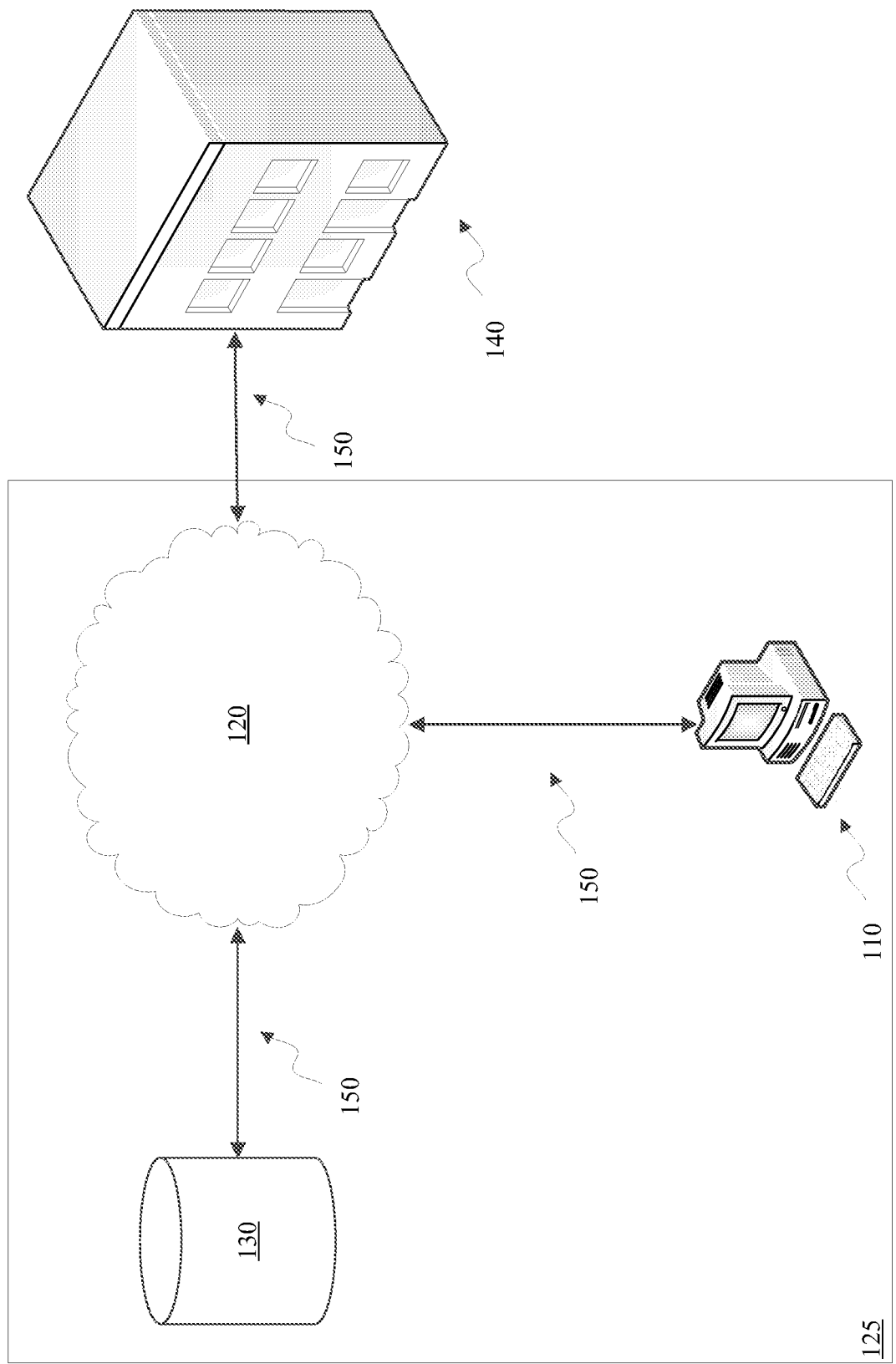
FIG. 1 illustrates aspects of a system for facilitating a Security Context Distribution Service (SCDS), according to one embodiment described herein.

One embodiment described herein provides a method that includes receiving, at a security context distribution service, from a first device operating on a first network, a request for a security context for the first device, where the request is signed using a private key preconfigured on the first device and where the request is encrypted using a public key associated with the security context distribution service. The method further includes decrypting the request and validating the request signature. Additionally, the method includes determining a set of device requirements based on a unique identifier for the first device and device claim information associated with the first device. The method also includes generating a response message that contains at least one Transport Layer Security (TLS) certificate associated with the first network, based on the set of device requirements, where the response message is encrypted using a public key associated with the first device and signed using a private key associated with the security context distribution service. The method includes transmitting the response message to the first device. Additional embodiments contemplated include a system and a non-transitory computer-readable medium containing computer program code that, when executed by one or more computer processors, carries out the aforementioned method.

Another embodiment described herein provides a device that includes one or more computer processors and a memory containing computer program code that, when executed by operation of the one or more computer processors, performs an operation. The operation includes initiating an operation to configure the device with a security certificate associated with a first network. Additionally, the operation includes retrieving a private key that was preconfigured on the device. The operation includes generating a request for a security context for the device, wherein the request is signed using the private key and wherein the request is encrypted using a public key associated with a security context distribution service. The operation further includes transmitting the request to the security context distribution service, wherein the security context distribution service is configured to decrypt the request message and validate the signature of the request message. Additionally, the operation includes receiving a response message from the security context distribution service, wherein the response message contains at least one Transport Layer Security (TLS) certificate associated with the first network, wherein the security context distribution service is configured to sign the response message using a private key associated with the security context distribution service and wherein the security context distribution service is configured to encrypt the response message using a public key associated with the device. Upon decrypting the response message using the private key preconfigured on the device and validating the signature of the response message, the operation includes configuring the device to use the received TLS certificate. Additional embodiments contemplated include a system and a non-transitory computer-readable medium containing computer program code that, when executed by one or more computer processors, carries out the aforementioned operation, as well as the operation carried out as a method.

Another embodiment described herein provides a non-transitory computer-readable medium containing computer program code that, when executed by operation of one or more computer processors, performs an operation. The operation includes receiving, at a security context distribution service, from a first device operating on a first network, a request for a security context for the first device, wherein the request is encrypted using a public key of the security context distribution service. The operation further includes decrypting the received request using a private key associated with the security context distribution service. Additionally, the operation includes determining a set of device requirements based on a unique identifier for the first device and device claim information associated with the first device. The operation also includes generating a response message that contains at least one Transport Layer Security (TLS) certificate associated with the first network, based on the set of device requirements, wherein the response message is signed using the private key associated with the security context distribution service, and transmitting the response message to the first device. Additional embodiments contemplated include a system and a device containing computer program code that, when executed by one or more computer processors, carries out the aforementioned operation, as well as the operation carried out as a method.

Another embodiment provided herein provides a device that includes one or more computer processors and a memory containing computer program code that, when executed by operation of the one or more computer processors, performs an operation. The operation includes initiating an operation to configure the device with a security certificate associated with a first network. Additionally, the operation includes retrieving a public key associated with a security context distribution service and generating a request for a security context for the first device, where the request is encrypted using the public key associated with the security context distribution service. The operation also includes transmitting the request to the security context distribution service, where the security context distribution service is configured to decrypt the request message, and subsequently receiving a response message from the security context distribution service, where the response message contains at least one Transport Layer Security (TLS) certificate associated with the first network, and where the security context distribution service is configured to sign the response message using a private key associated with the security context distribution service. Upon validating the signature of the response message, the operation includes configuring the first device to use the received TLS certificate.

DETAILED DESCRIPTION

In the emerging world of the Internet of Things (IoT) or more generally, Cyber Physical Systems (CPS), a convergence of multiple technologies is underway to allow the sensing, actuation, data capture, storage, and/or processing from a large array of connected elements, devices, and/or components be them physical, virtual, and/or a hybrid combination of the two. These connected elements may be accessed remotely using existing network infrastructure to allow for efficient Machine to Machine (M2M) and Human to Machine (H2M) communication. As a result of such communications and as the network of connected elements changes over time, an increasing amount of data from these connected elements will be generated, allowing for correlations which have not been possible before. Issues of securing data associated with these dynamic sets of connected elements and the solutions they provide is a significant challenge.

Complicating this challenge is the penetration of IoT devices into a variety of environmental contexts, with examples including end-user, enterprise, and/or industry. As IoT computing devices rapidly become more available and utilized, improperly secured IoT devices present a highly attractive target for compromising valuable data and the associated infrastructure. Data theft, creation of botnets, theft of valuable information, performance of attacks on infrastructure via connected IoT devices remain an issue. It should be appreciated that not all IoT devices consume or provide data services directly, but those that do, including IoT gateways and edge devices, are vulnerable to data security concerns.

IoT devices are generally constrained in terms of their computing resources, such as storage, CPU, and/or memory. Even if such devices are not resource-constrained, it may be beneficial to avoid complexity and management overhead of integrating IoT device management into a larger environment. Such devices also may be placed in a variety of connectivity contexts which may make conventional cloud connectivity problematic absent additional configuration. Due to this, a security challenge exists for IoT devices which do not commonly apply to conventional computing devices and systems, e.g., laptop computer systems, desktop computer systems, servers with software that allow deployments of security information at scale, etc. This challenge includes securely deploying devices without requiring a manual commissioning process.

Devices also may be placed in a variety of connectivity contexts such as Transport Layer Security (TLS) inspection and/or encrypted packet inspection. Such connectivity contexts may make conventional cloud connectivity problematic absent additional configuration which is generally deployed via enterprise Information Technology (IT) management. Use of security practices, such as, TLS inspection, are becoming increasingly common. Jointly, these problems present security challenges for IoT devices which do not commonly apply to conventional computing devices and systems and present a technical challenge in how to deploy the security context necessary for subsequent operation and service consumption to an IoT device, without requiring a manual commissioning process for each device.

Embodiments described herein provide a solution to this security challenge by providing a requisite security context for devices (e.g., IoT devices, Industrial Internet of Things (IIoT) devices, etc.) which enables subsequent secure data communications by the devices. This process may be called "security bootstrapping" as when this process is activated, for example during a boot process by an IoT device, the detailed security is enabled. This process may include TLS Certificate Authority (CA) certificates used to enable a TLS inspection, as well as other public security configurations such as service endpoints, and private security configurations such as security tokens. Embodiments described herein may also be applied to an IoT device vendor who desires to supply the same type of IoT device to multiple customers and requires a mechanism to deploy to the IoT devices they manufacture or configure the customized security context specific to a given customer, tenant, site, or even device, without having to determine and install that security context at manufacture or factory configuration time, and without requiring the manual deployment of this security context at commissioning time. Embodiments described herein provide techniques for creating a secure channel to deliver and/or receive information securely from a remote server to an IoT device, and may be useful for many purposes including delivering proxy configuration information to an IoT device.

Example IoT systems and applications may include, but are not limited to: (1) managing HVAC systems to assure the comfort of facility occupants, (2) maintenance of a particular environmental air quality (which may consist of temperature, humidity, and carbon dioxide content) for storage or occupants and dynamically adjusting a working building environment according to the prevailing weather conditions, (3) managing a facility management through controlling and optimizing regarding energy consumption through active control of lighting, heating, and cooling, and (4) monitoring day to day operations, maintenance, and oversight of facility operations. Commercial embodiments of such applications may be a part of building management or automation system.

It is to be understood that the system described herein facilitates significant flexibility in terms of configuration and/or end user application and that although several examples are described, alternative embodiment configurations and applications are also possible. Embodiments of these systems and methods may be performed by individuals who are relatively non-technical in nature and require a rich interactive experience which hides the complexity of the security problem. Advantages of the various embodiments contained herein allow for a turnkey secure solution for deployment of IoT devices without requiring significant post installation configuration.

As an IoT device is first installed and connected to a network, the initial procurement of the local IP address and proxy information may be enabled by, for example, Dynamic Host Configuration Protocol (DHCP) and/or Domain Name System (DNS) protocols, in conjunction with Web Proxy Auto Discovery (WPAD) protocol. It is beneficial to minimize the amount of manual commissioning subsequently required to connect a device to the network IoT services it utilizes to function. However, if the device is being installed on a local network is segregated from the network by a TLS-inspecting proxy, initial attempts to contact any TLS-encrypted network service may fail to function as expected. In such a case the certificate the device received and presented by the TLS-inspecting proxy, may be issued by a private certificate authority specific to that proxy, site, and/or proxy vendor. An example of what the "subject" and "issuer" attributes of such a certificate may include is shown below in Example 1.

$ openssl x509-in test.com.cer-subject-issuer-noout
issuer=/C=US/ST=California/O=Zscaler Inc./OU=Zscaler\
Inc./CN=Zscaler Intermediate Root CA (zscaler.net)\
/emailAddress=support@zscaler.com
subject=/OU=Domain Control Validated/OU=nsProtect Secure\
Xpress/CN=www.test.com Example 1—Certificate Authority Certificate In this example, the "issuer" attribute of the supplied certificate refers to a Certificate Authority (CA) certificate specific to a particular proxy vendor (in the depicted example, ZScaler). A related CA certificate is not recognized as a part of the Public Key Infrastructure (PKI), nor distributed with the PKI CA libraries. A resulting problem is how to install a proxy CA certificate as an authorized CA on the device. Traditionally this issue is addressed by having a manual commissioning step wherein the commissioning operator connects to the device, such as a local application, and adds the requisite CA to the list of authorized CAs installed on the device. However, this type of manual configuration scales poorly and a technical challenge exists in configuring multiple devices without significant additional costs and effort. Once the proxy CA is installed, network service consumption proceeds as it normally would where the device establishes a TLS session with the proxy, the proxy unwraps the TLS packets and forward them over a second TLS session to their intended destination.

FIG. 1 illustrates a system for facilitating a SCDS in accordance with various embodiments of this disclosure. The system utilizing a SCDS 125 may include one or more general purpose computers 110, one or more data storage arrays 130, a cloud computing environment 120, a building or other structure 140 which contains one or more connected elements (not shown), and network connections 150 to allow the exchange of data between these parts of the system.

In one embodiment of the system illustrated in FIG. 1, the building 140 contains one or more connected elements, components, devices, and/or drive components which are physical, virtual, or a hybrid of the two, that perform sensing, actuation, data capture, storage, or processing for the monitoring or control or management of the building 140. Any variety of connected elements may be used to capture, store, or process data, or actuate associated devices over the network connections 150, to the cloud computing environment 120, to other parts of the system. These connected elements may, for example, detect temperature, humidity, ambient light, sound, smoke, carbon monoxide, carbon dioxide, motion, non-conductive fluids, conductive fluids, vibration, energy, power, voltage, current, or any other desired characteristic, and combination thereof. Connected elements may also operate or articulate elements, components, and/or other systems such as turning on lights, opening a door or window, moving window shades, or triggering a door lock. Connected elements may also process data structures from other connected elements or propagate data structures from one or more connected elements to one or more other connected elements. Any number of connected elements may be deployed in any combination to monitor or manage a physical space. Examples of such a space may include a closet, room, building, campus, office, promenade, or any other desired location.

One or more buildings 140 containing a connected element may ultimately connect to a cloud-computing environment 120 through a network connection 150. This connection allows access to the cloud computing environment 120 by a variety of devices capable of connecting to such an environment in either a wired or wireless connection manner. From FIG. 1 such devices may include one or more general-purpose computers 110 capable of receiving input from a user or to provide autonomous operation. One or more data storage arrays 130 may be utilized to provide additional data storage capability. It should be appreciated a cloud computing environment 120, while providing additional communication paths to additional elements or systems, is not required as part of the semantic search method. Some other embodiments contemplate self-contained or stand-alone systems.

The network connections 150 may be wired or wireless connection types. Such connections may include, but are not limited to, any physical cabling method such as category 5 cable, coaxial, fiber, copper, twisted pair, or any other physical media to propagate electrical signals. Wireless connections may include, but are not limited to personal area networks (PAN), local area networks (LAN), Wi-Fi, Bluetooth, cellular, global, or space based communication networks. Access between the cloud environment 120 and any other cloud environment is possible in other implementations these other cloud environments are configured to connect with devices similar to cloud environments such as the existing cloud environment 120. It is to be understood that the computing devices shown in FIG. 1 are intended to be illustrative only and that computing nodes and cloud computing environments may communicate with any type of computerized device over any type of network with addressable or direct connections.

The SCDS 125 may contain the elements details in FIG. 1, may include additional or fewer of these elements, or may be located in a building 140 (or, e.g., a series of buildings). A SCDS 125 may be physical, may be virtual, or a hybrid combination of both. No limitations are implied as to the composition, location, or organization of the SCDS 125.

Figure 2:
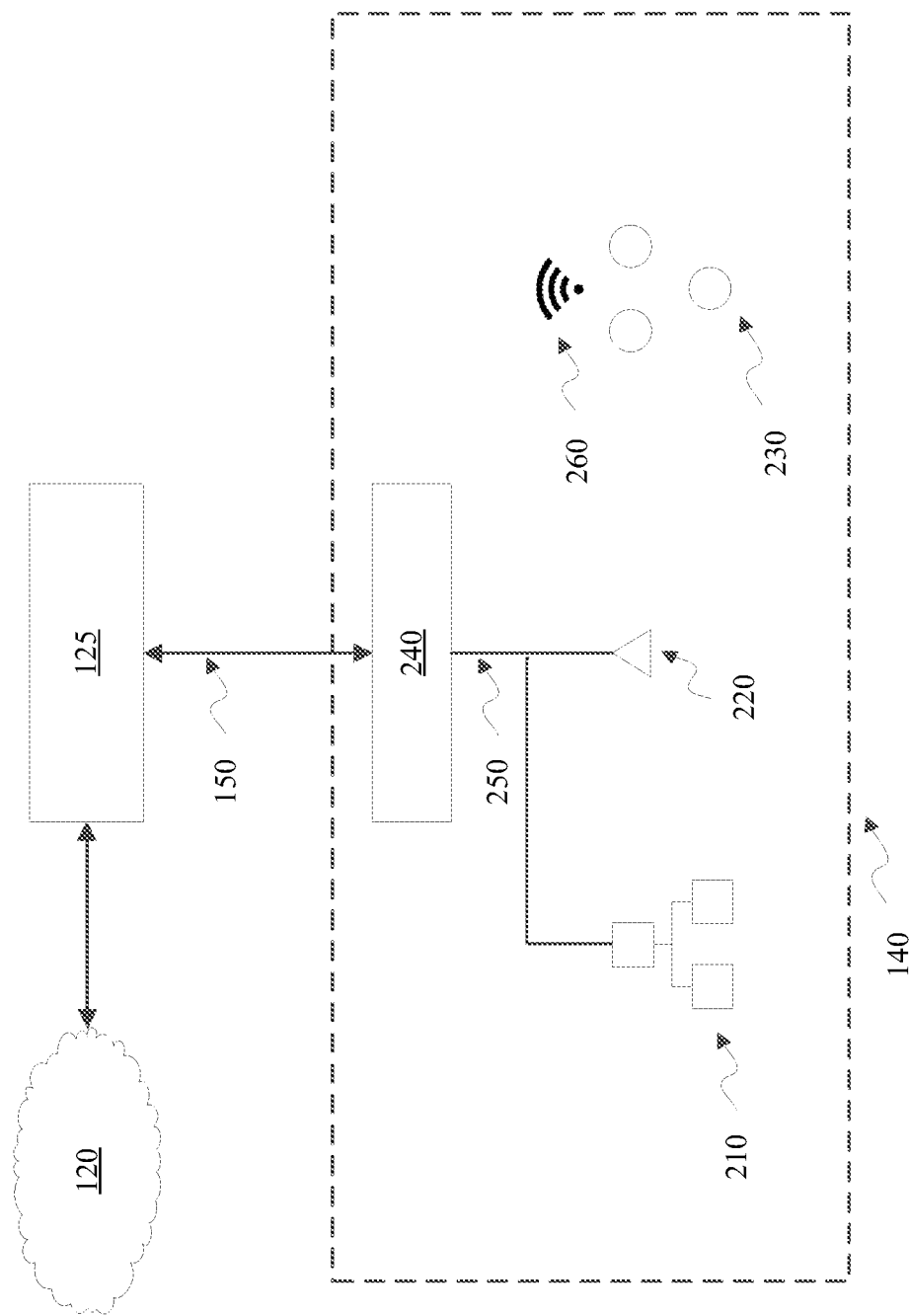
FIG. 2 illustrates a system that includes different types of devices connecting to a SCDS, according to one embodiment described herein.

FIG. 2 illustrates various embodiments of how different types of devices may connect to a SCDS in accordance with various embodiments of this disclosure may be implemented. In one embodiment of FIG. 2, the building 140 contains one or more types of connected elements 210, 220, 230, 240 for the monitoring or management of the structure. These connected elements 210, 220, 230, 240 communicate via a wired 250 or wireless 260 networks and makes the data structures from each connected element available to the SCDS 125 and/or the cloud environment 120 via the network connections 150.

Any variety of connected elements may be used to perform sensing, actuation, data capture, storage, or processing over the network connection 150, to the SCDS 125, cloud computing environment 120, to other parts of the system. For example, connected elements may be connected sensors to measure carbon dioxide 210 for monitoring air quality of the building 140 and communicate via a wired network connection 250. Connected element may be both a connected sensor to detect ambient light and also an actuator 220 to change the state of an occupant light fixture and communicate via a wired network connection 250. Connected elements may be connected sensors for temperature and humidity 230 to monitor environment of the building 140 and communicate via a wireless network connection 260. Finally, connected element 240 serves as a connected gateway to communicate with the associated connected elements 210, 220, 230, via their respective network connections 250, 260, process the data structures of each, and transmit same to a network connection 150 for transmission to the cloud environment 120. It should be appreciated a cloud computing environment 120, while providing additional communication paths to additional devices or systems, is not required as part of the semantic search method. Other embodiments contemplate self-contained or stand-alone systems.

These connected elements need not be geographically localized or logically grouped in any way to utilize embodiments of this disclosure. Grouping connected elements geographically or logically may allow more economic use. A geographic grouping such as in an apartment, home or office building may be accomplished, as well as logically locating connected elements by function. One of many logical grouping examples may be locating connected end points designed to sense temperature, proximate to an occupied location to detect changes in environment. It should be appreciated that the groupings of connected endpoints may also be located on a very large geographic scale, even globally. Such global operations may be monitored through a network located in any number of facilities around the globe.

FIG. 3A illustrates an exemplary deployment of various connected elements of a SCDS in which various embodiments of the present disclosure may be implemented. A "North" building 310 and a "West" building 320 are illustrated. Each building has (3) floors associated with each. North Floor (1) 312, North Floor (2) 314, North Floor (3) 316 are contained within the North building 310. West Floor (1) 322, West Floor (2) 324, and West Floor (3) 326 are contained within the West building 320. Each floor has (3) connected elements of different types. For example, connected elements may be connected sensors to measure carbon dioxide 330, 332, 334, 360, 362, 364 for monitoring air quality of the building 310, 320 respectively and communicate via a wired network connection. Connected elements may be both a connected sensor to detect ambient light and an actuator 340, 342, 344, 370, 372, 374 to change the state of an occupant light fixture and communicate via a wired network connection. Connected elements may be connected sensors for temperature and humidity 350, 352, 354, 380, 382, 384 to monitor environment of the building 310, 320 respectively and communicate via a wireless network connection. As illustrated a SCDS 125 is connected to the system to provide semantic querying and operational rules to the connected elements to effectuate changes on the system.

Figure 3B:
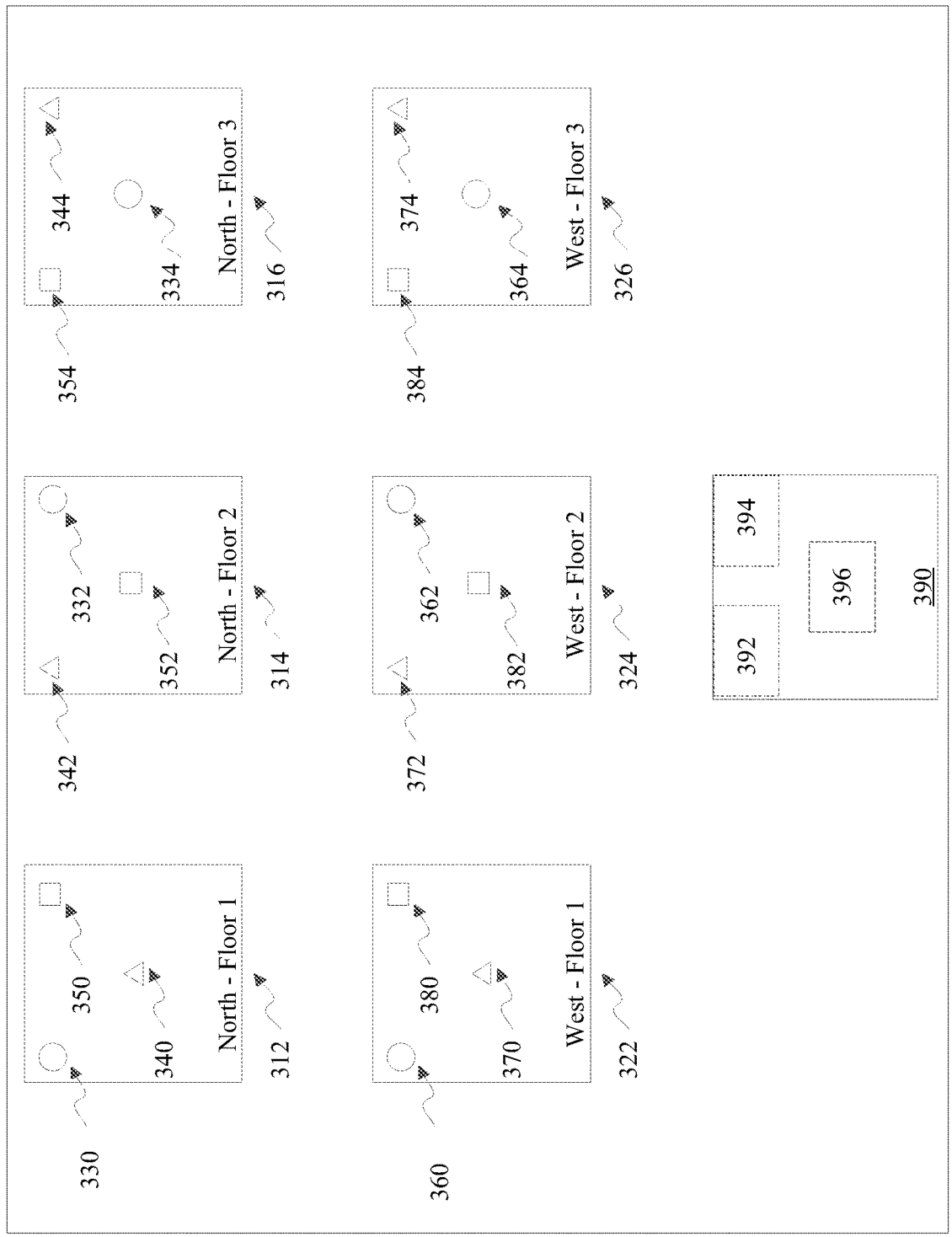

FIG. 3B illustrates exemplary deployment of connected elements across a variety of physical locations of a SCDS from FIG. 3A in which various embodiments of the present disclosure may be implemented. Within each floor of each building multiple connected elements exist. As an example, temperature and humidity 350, 352, 354, 380, 382, 384 carbon dioxide 330, 332, 334, 360, 362, 364, and ambient light 340, 342, 344, 370, 372, 374 connected elements exist on each floor of each building. Further, each connected element may exist in a distinct zone on each floor of each building. As one of many examples, a general floor plan 390 may indicate zones that are defined as "Zone 1" 392, "Zone 2" 394, and "Zone 3" 396. It should be appreciated that such designations are highly configurable by a user or other system and are shown here for illustrative purposes only.

Given the connected element configuration illustrated in FIGS. 3A and 3B, each connected element possesses a data structure that includes, but not be limited to, sensor specific information (temperature/humidity, carbon dioxide, and ambient light), geographic information (zone, floor, building), and network information (MAC address, IP address, wired, wireless). Other connected element information may be available as well as information relative to the operation of the connected element itself. As one example, a status of online or offline may be available to further add to the data construct for each connected element.

Figure 4A:
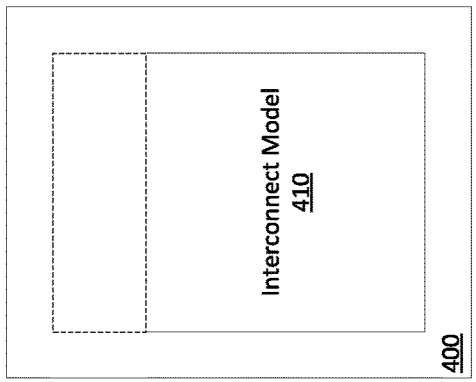
FIGS. 4A-B illustrate block diagrams showing various states of device customization, according to embodiments described herein.
Figure 4A:
Figure 4A:
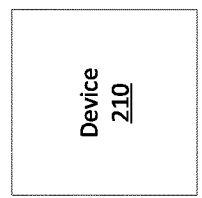

FIG. 4A illustrates an example block diagram of a device prior to customization in accordance with various embodiments of the disclosure. Embodiments of the disclosure contemplate devices 400 prior to customization comprising several hardware and/or software modules in the form of an interconnect model 410 which serve to allow the necessary flexibility for benefits of the disclosure.

A pre-customization device 400 may have at least a physical hardware layer. It is appreciated this hardware in some embodiments may be virtual in nature. Such hardware represents the foundation on which the operating system for the device 400 interacts to provide the desired functionality of the device itself.

Various Open Systems Interconnection (OSI) layers may be utilized as well and contain functionality such as to define the characteristics of the device 400 itself (e.g., a temperature sensor) and/or provide necessary functionality to perform the functions it was designed for. One example of such functions may be a bootloader where such a layer is necessary to allow customized configurations as well as fundamentals such as the device firmware to be loaded onto the device 400. In this way a device 400 may have a set of hardware or similar capabilities, however may be utilized based on available dynamic customization as any device 400 that utilizes the available resources available to the device 400.

It should be appreciated that this pre-customization device 400 while functional in some environments, may or may not be capable of operating in a secure environment until it is transformed by the systems and methods of the present disclosure into a configured device.

Figure 4B:
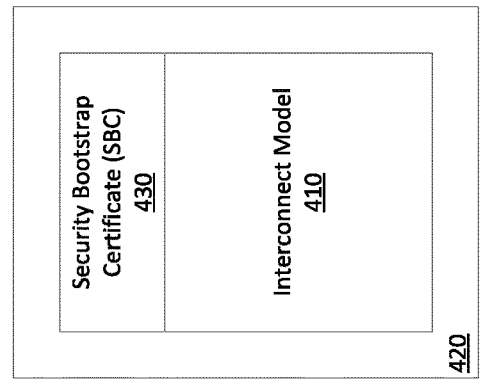
Figure 4B:
Figure 4B:
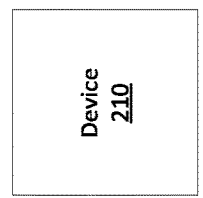

FIG. 4B illustrates an example block diagram of a device after customization in accordance with various embodiments of the disclosure. Once the dynamic customization process described herein has been completed for the device 400, a transformation occurs with the inclusion of a specific Security Bootstrap Certificate (SBC) 430 layer. This layer may be configured dynamically at deployment time in an environment to allow maximum flexibility for the particular application. In this way a pre-configured device 400 that would otherwise be unable to be used in a secure environment without manual configuration is transformed into a secure capable device 420. Moreover, such a device may be deployed into an environment and re-deployed into a different environment as required, without the need for manual configuration and reconfiguration of the device.

Figure 5A:
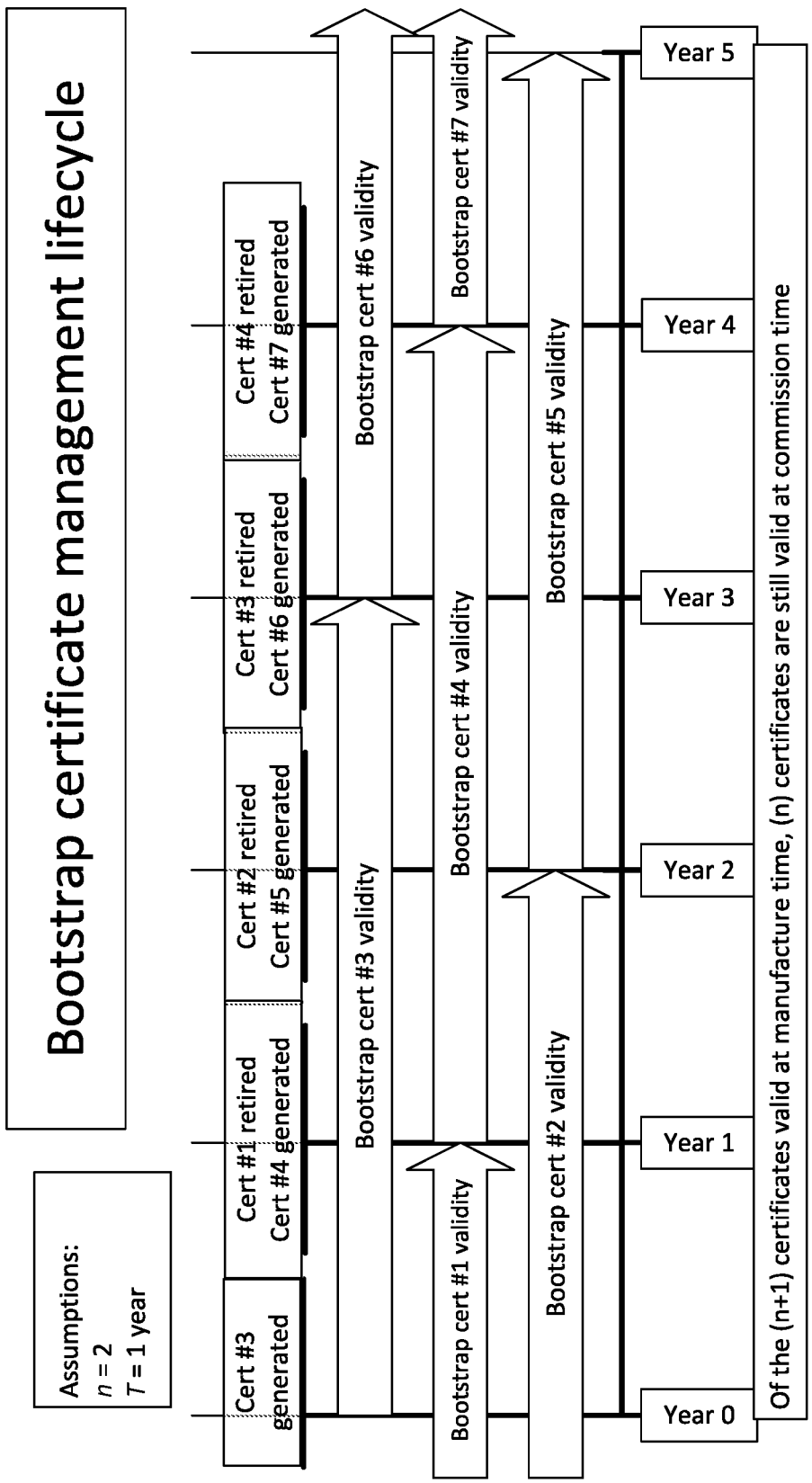
FIGS. 5A-B illustrate certificate management lifecycle diagrams, according to embodiments described herein.
Figure 5B:
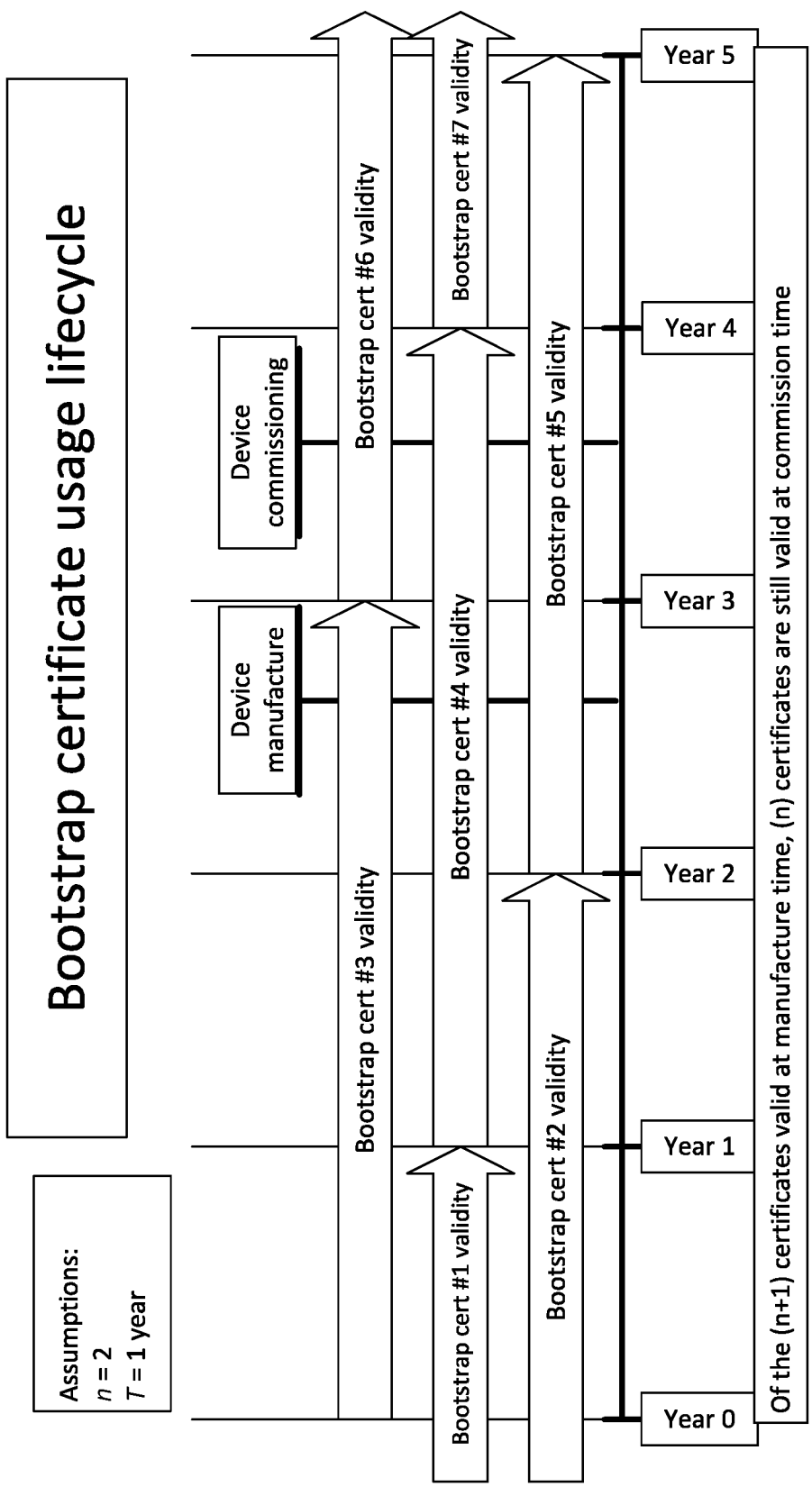

FIG. 5A illustrates embodiments of a certificate management lifecycle diagram of embodiments of a SCDS and FIG. 5B illustrates embodiments of a certificate usage lifecycle diagram of embodiments of a SCDS. Public certificates for the SCDS process may be generated and used at the application level of the OSI stack. Such certificates may not need to be the certificates used by SCDS to expose the TLS service endpoints. Further the authenticity of the certificates is validated to the client device related to their being stored on the device at the time of manufacture or factory configuration. As such, there may be no need to go through full PKI certificate validation process. It may be desirable however to monitor the certificate validity time, so as to ensure that the recommended certificate rotation practices are observed. From this point it is possible, and operationally and economically beneficial, to use the SBC signed by a private certificate authority. Even utilizing a private CA, a client certificate should follow PKI guidelines to assure robust security practices. Some embodiments support a SBC signed by a private CA, provided it is known to SCDS. Various embodiments of these considerations are illustrated in the lifecycle diagram in FIG. 5A.

Embodiments of this disclosure contemplate various SBC rotation considerations as illustrated in FIG. 5A. It is beneficial to utilize PKI-compliant certificates to perform security bootstrapping operation. Use of other certificates is also contemplated, such as raw public keys. Certificates may be rotated based on several factors and various rotation practices. As illustrated in FIG. 5A, note that the two key considerations, n and T, may be driven by business requirements and/or security policies. Based on the characteristics described above, one or more certificates may be valid at any given time, and at the time of the device manufacture or factory configuration, all the currently valid bootstrap certificates may be stored on the device making them available for use.

An SBC 430 may have a valid date range, after which the SBC 430 becomes invalid. This validity time range may be bounded for security reasons. As the SBC 430 certificates need not be fully verified in PKI context and may be self-signed or privately signed, it is desirable to have SBC 430 be distinct from the SCBS service certificates. SCBS may use multiple SBC 430 with overlapping validity ranges.

To illustrate an example, given a device is manufactured one day before the SCBS certificate expires, and is configured with the SCBS certificate in store, it will be unable to fully verify that certificate when attempting to perform the CA bootstrapping transaction with SCBS. Further, if a given SBC becomes compromised, SCBS and the client should still be able to perform the CA bootstrapping to allow operation of the device even if one certificate is invalid, expired, and/or compromised.

It may be beneficial to rotate certificates more frequently than their validity period and store multiple certificates on a given device to allow for continuous and robust operation of devices.

From FIGS. 5A and 5B, consider an example utilizing the following considerations:
- n: Minimum number of valid certificates which are present at the time of device commissioning. (n≥1).
- T: Duration of time which may be allowed to expire between device manufacture and device commissioning. This variable contemplates the realities of a supply chain and other logistics and business operations that are not instantaneous, such as supply chain length.
- v: Duration of time for which each service certificate must be valid. In one embodiment, the value v is calculated as T*(n+1)). As a result, if a value of 1 year is used for T and n=1, v will be two years (i.e., 1*(1+1)).
- r: Duration of time between certificate refreshes. (r≤T).

In this example, if n=2 and T=1 year, the SCBS certificates must be generated with a 3-year validity duration, but rotated after 1 year, with the decommissioned but still valid certificates being used as a fallback. All the still-valid certificates would be stored on the client device, thus permitting the client to have at least one valid certificate at the time of field commissioning and allowing for secure operations. This concept of dynamic decommissioning SCBS certificates part-way through their validity is termed as "rolling" the SCBS certificates.

Figure 6A:
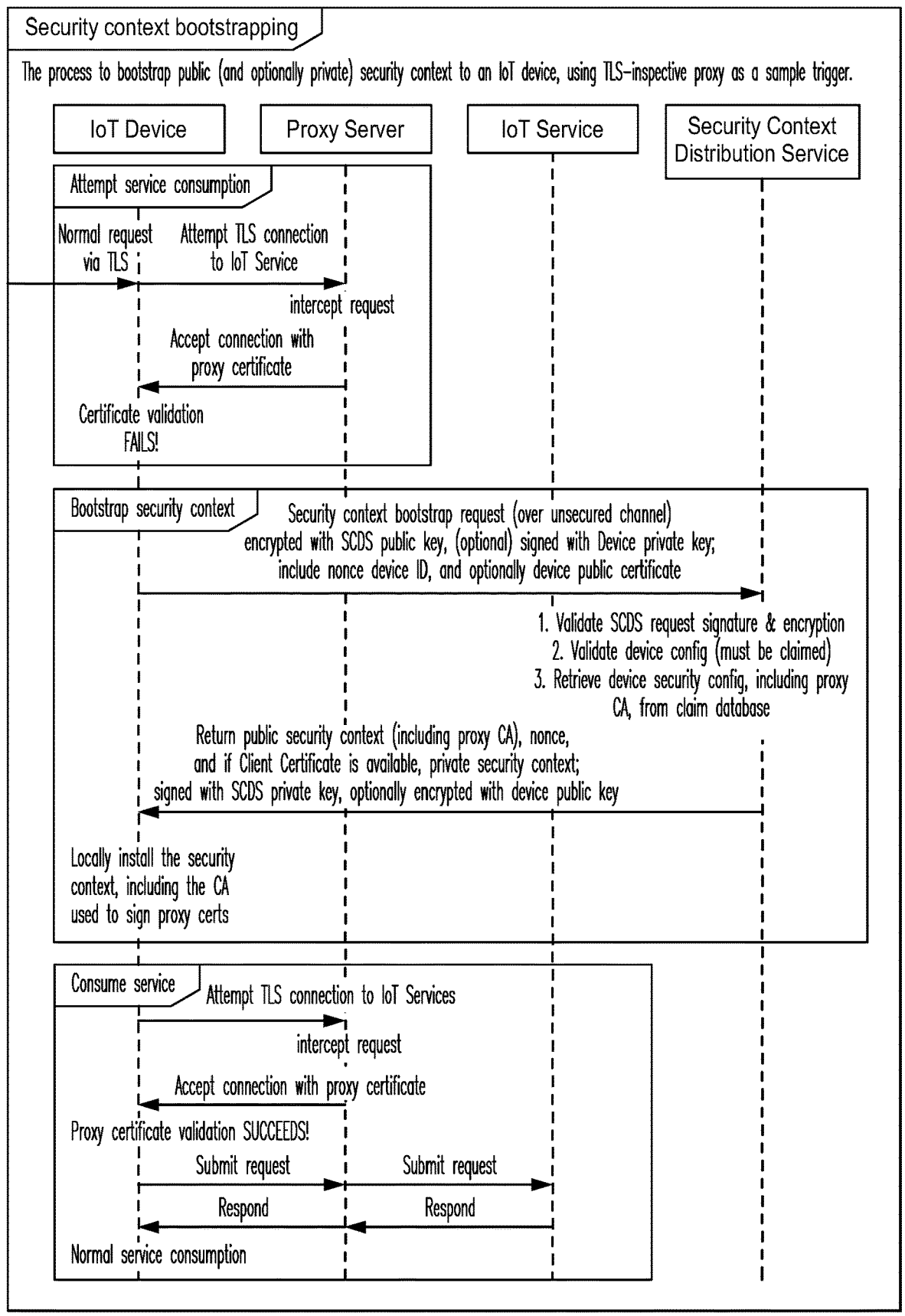
FIGS. 6A-B illustrate sequence diagrams for executing various operations of a SCDS, according to embodiments described herein.

FIG. 6A illustrates embodiments of a sequence diagram for executing various embodiments of a SCDS. Various embodiments of this disclosure illustrate methods which allow for a turnkey secure solution for deployment of IoT devices without requiring significant post installation configuration. This may include, but is not limited to, custom public security context (e.g., public, site-specific CA certificates for TLS-inspecting proxies) which may be bootstrapped onto an off-the-shelf IoT device, enabling a "plug-and-play" commissioning. This customization may be per-application, per-tenant, and/or per-device. Embodiments may be performed over unsecured communication channels, for example, but not limited to, plaintext HTTP and/or unverified HTTPS, which is beneficial based on the operation of TLS-inspecting proxies.

Embodiments of the disclosure illustrate methods that may trigger bootstrapping on a client device. These include but are not limited to: first boot of a device, unknown CA presented by each TLS connection, an explicit application trigger, and/or a periodic trigger.

FIG. 6A also illustrates embodiments of the disclosure executing the bootstrap on a client where device may be manufactured with at least one bootstrap server certificate pre-configured at manufacture, factory configuration phase, and/or dynamically once installed in an environment. Certificates are valid for sufficient duration of time, which is configurable, to account for distribution chain delays and other similar considerations. One or more of these certificates may be utilized by the SCBS service as bootstrap certificates. It is beneficial for a device to also have a client certificate and key pre-installed.

A client constructs a message containing device identity, a cryptographically strong nonce (e.g., a GUID), and the device's public client certificate. This message is encrypted with one of the valid bootstrap certificates.

FIG. 6A also illustrates embodiments of the disclosure for executing the bootstrap on the SCBS where the bootstrap request message is received and is decrypted utilizing a private key. Device requirements are then determined based on characteristics such as device ID, tenancy, custom CAs, and/or custom secret info among others. A response message is then created containing the nonce (to prevent replay) and/or custom CA. It should be appreciated, other elements may be included as determined necessary based on the requirements of the device, message size, and other factors. This response message is then signed with a private key.

Figure 6B:
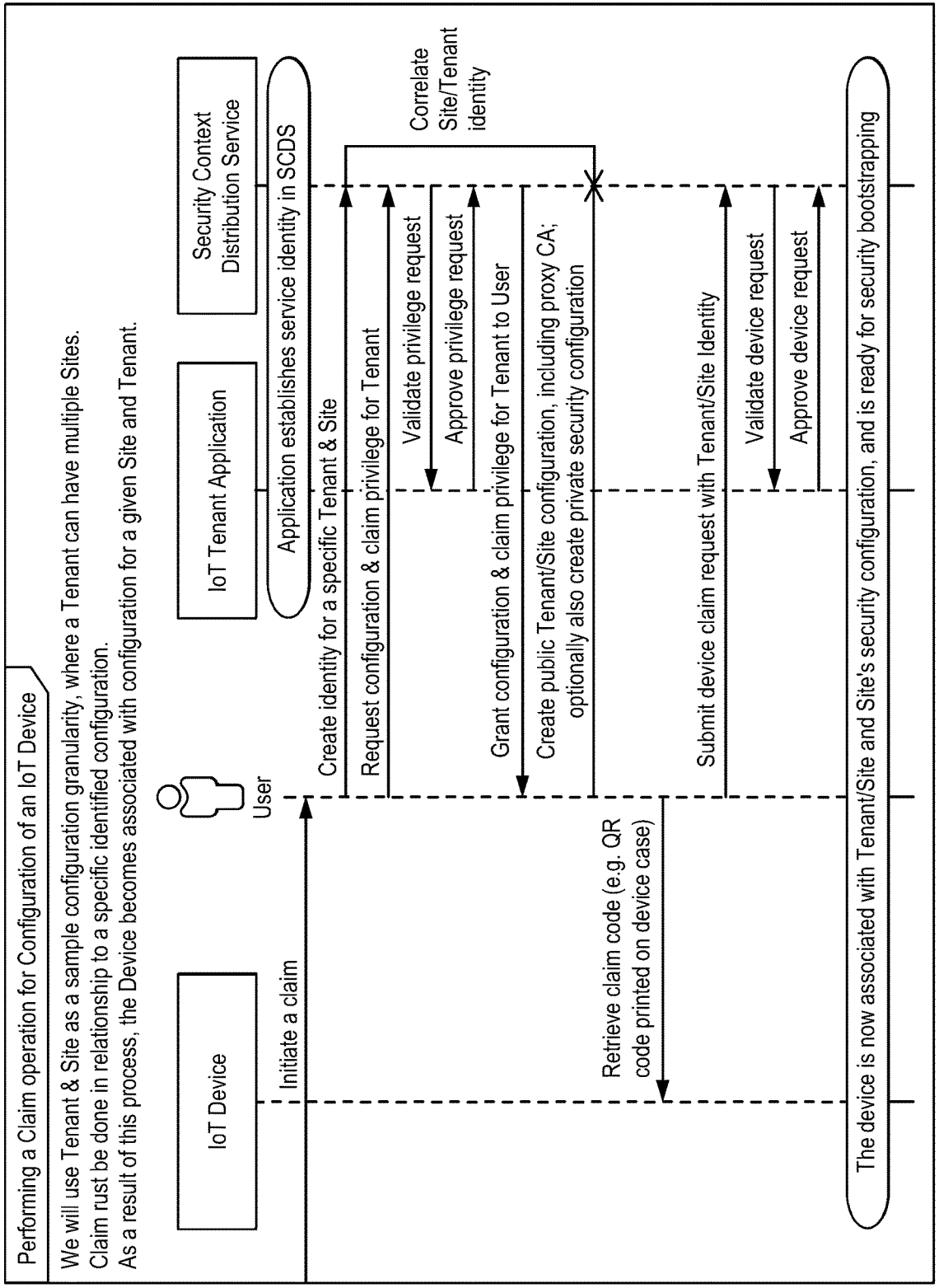

FIG. 6B illustrates embodiments of a sequence diagram for claiming devices in various embodiments of a SCDS. Device requirement determination may be determined utilizing device claim information. Devices can be either pre-claimed by tracking them through the distribution chains or they can be claimed by the user using a claim process, such as, but not limited to a scanning device QR code.

Supporting the SCBS bootstrap capability benefits from maintaining and rotating a set of bootstrap keys and/or certificates. These may be one or more public keys, public certificates, private keys, private certificates and/or a mixture of all. If using certificates, it is beneficial for these certificates to be distinct from any service certificates. If using certificates, they may be self-signed, and/or signed by a private CA, and should have enough remaining validity durations to enable the client to have one or more valid bootstrap certificates even after accounting for the delay due to distribution chains and other business drivers. In this way, at least one secure signing event will be permitted and the benefits described herein or the multiple and rotating keys and certificates may be fully realized.

Figure 7:
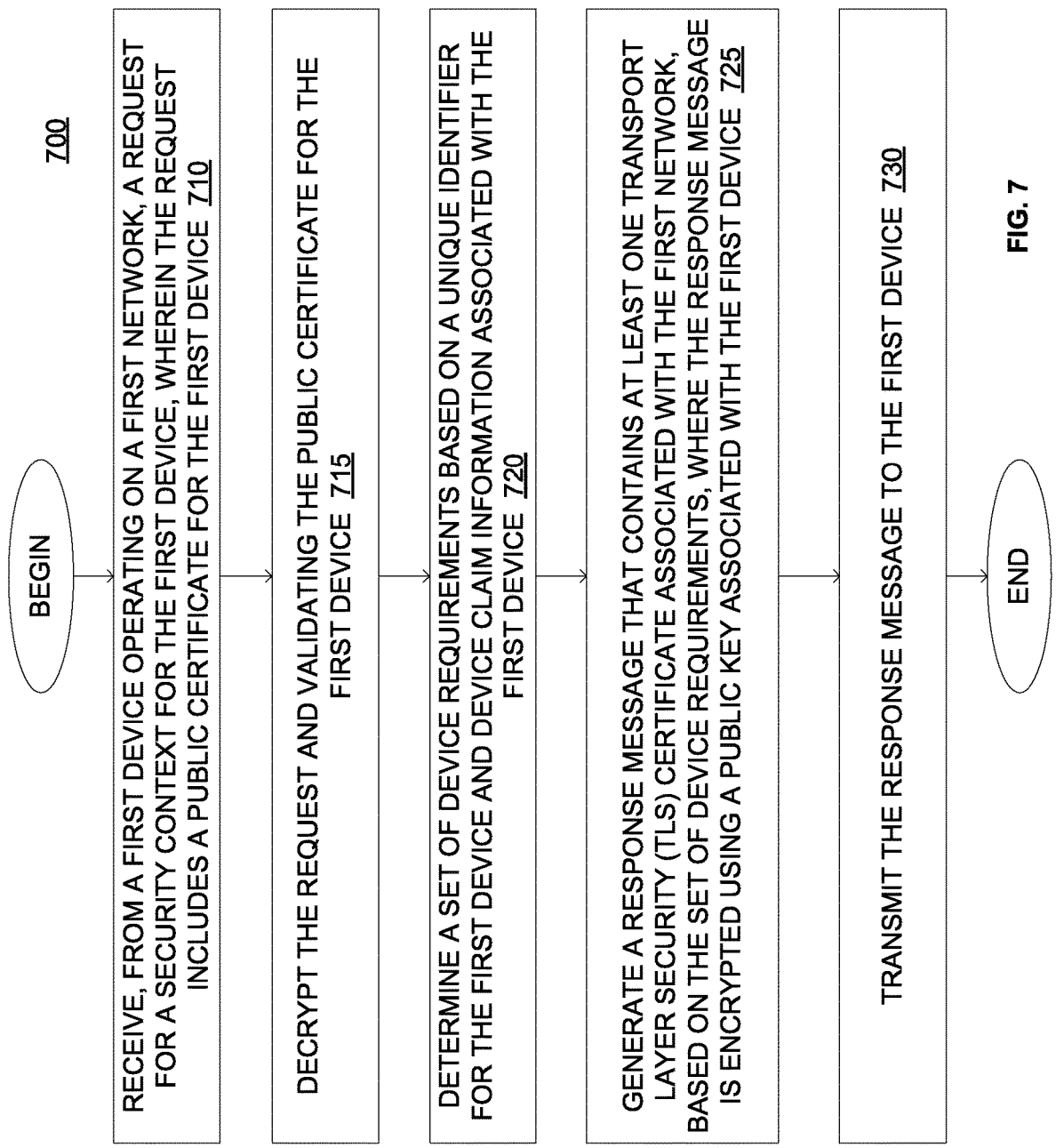
FIG. 7 is a flow diagram illustrating a method of operating a security context distribution service to configure a device with a security certificate, according to one embodiment described herein.

FIG. 7 is a flow diagram illustrating a method of operating a security context distribution service to configure a device with a security certificate, according to one embodiment described herein. As shown, the method 700 begins at block 710, where a security context distribution service receives, from a first device operation on a first network, a request for a security context for the first device. In the present example, the request includes a public certificate for the first device. The security context distribution service decrypts the request and validates the request signature (block 715).

Additionally, the security context distribution service determines a set of device requirements based on a unique identifier for the first device and device claim information associated with the first device (block 720). In the depicted embodiment, the security context distribution service then generates a response message that contains at least one Transport Layer Security (TLS) certificate associated with the first network, based on the set of device requirements (block 725). The response message is encrypted using a public key associated with the first device and signed using a private key associated with the security context distribution service. The security context distribution service transmits the response message to the first device (block 730), and the method 700 ends.

Figure 8:
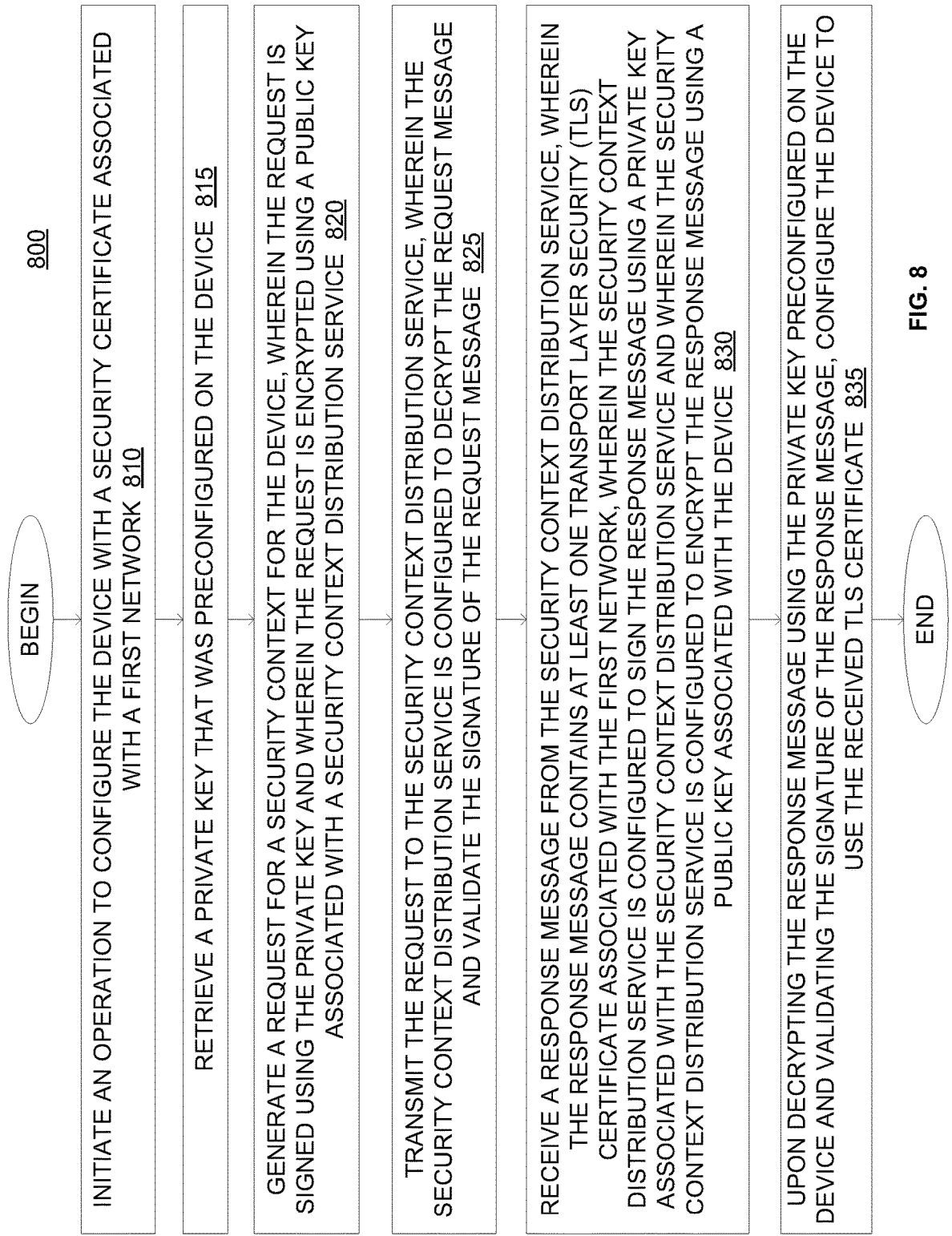
FIG. 8 is a flow diagram illustrating a method of automatically configuring a device on a network with a security certificate for the network, according to one embodiment described herein.

FIG. 8 is a flow diagram illustrating a method of automatically configuring a device on a network with a security certificate for the network, according to one embodiment described herein. The method 800 begins at block 810, where logic on a device initiates an operation to configure the device with a security certificate associated with a first network. For example, the logic could determine to initiate the operation based on at least one of (i) a first boot operation, (ii) a user command, (iii) a scheduled update and (iv) attempting to establish a secure socket connection on the device.

The logic retrieves a private key that was preconfigured on the device (block 815). For example, the manufacturer of the device could store the private key in a secure storage location on the device at the time the device was manufactured and initially configured. Additionally, the logic generates a request for a security context for the device, signs the request using the private key and encrypts the request using a public key associated with a security context distribution service (block 820). In one embodiment, the request includes a unique identifier for the device. In a particular embodiment, the request includes a cryptographically secure nonce. Additionally, in one embodiment, the private key used to encrypt the request is one of a plurality of private keys preconfigured on the device by the manufacturer, and the logic is configured to rotate usage of the private keys according to a rotation schedule.

The logic transmits the request to the security context distribution service, wherein the security context distribution service is configured to decrypt the request message and validate the signature of the request message (block 825). At some later point in time, the logic receives a response message from the security context distribution service (block 830). In the depicted example, the response message contains at least one Transport Layer Security (TLS) certificate associated with the first network. The security context distribution service is configured to sign the response message using a private key associated with the security context distribution service and is further configured to encrypt the response message using a public key associated with the device. In one embodiment, the TLS certificate is a Certificate Authority (CA) certificate. In one embodiment, the response message further contains at least one of credentials, service tokens and privileged endpoint data. Upon decrypting the response message using the private key preconfigured on the device and validating the signature of the response message, the logic configures the device to use the received TLS certificate (block 835), and the method 800 ends.

Figure 9:
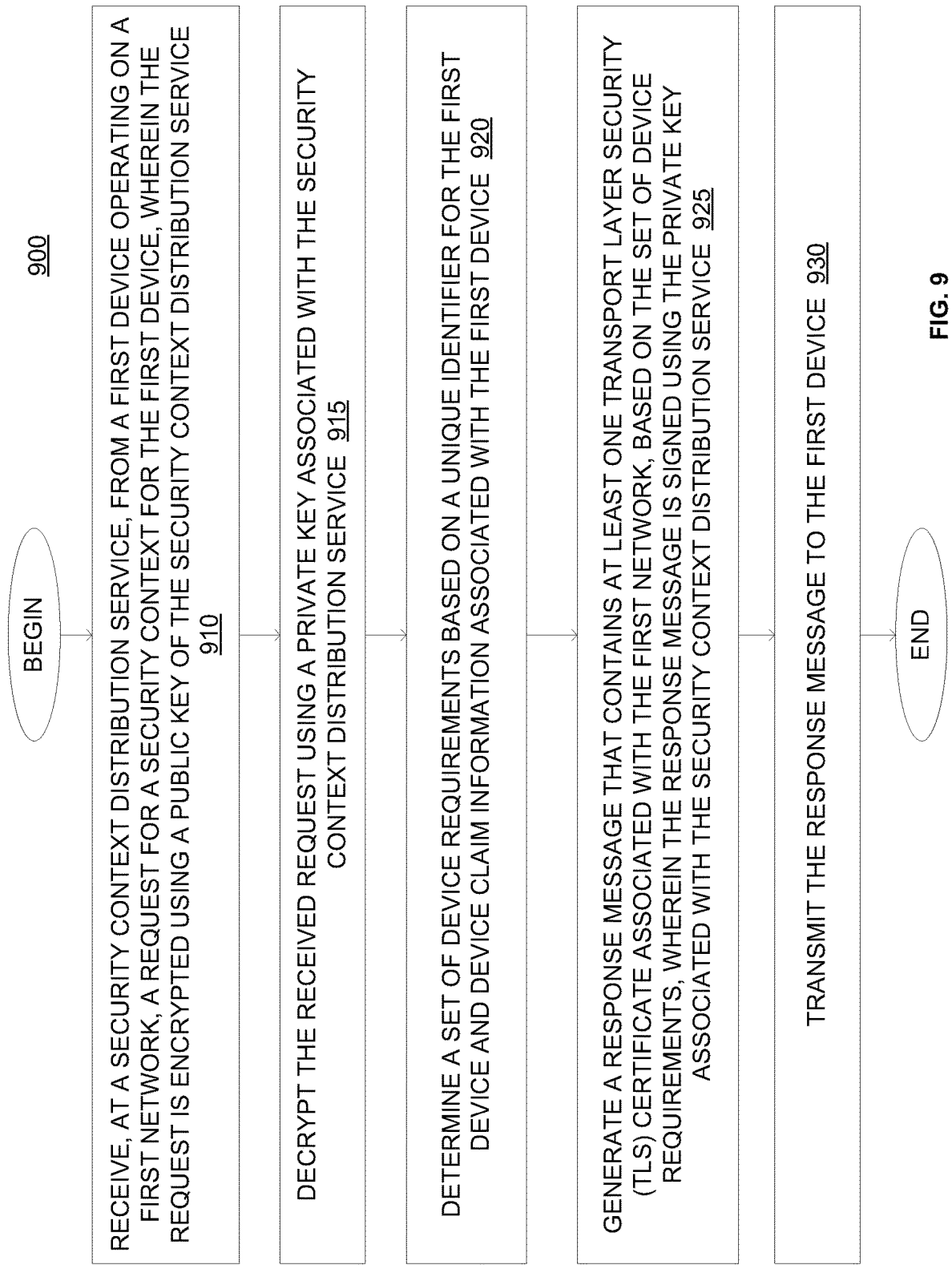
FIG. 9 is a flow diagram illustrating a method of operating a security context distribution service to configure a device with a security certificate, according to one embodiment described herein.

FIG. 9 is a flow diagram illustrating a method of operating a security context distribution service to configure a device with a security certificate, according to one embodiment described herein. As shown, the method 900 begins at block 910, where the security context distribution service receives, from a first device operating on a first network, a request for a security context for the first device. The request is encrypted using a public key of the security context distribution service.

The security context distribution service decrypts the received request using a private key associated with the security context distribution service (block 915) and determines a set of device requirements based on a unique identifier for the first device and device claim information associated with the first device (block 920). The security context distribution service then generates a response message that contains at least one Transport Layer Security (TLS) certificate associated with the first network, based on the set of device requirements, and signs the response message using the private key associated with the security context distribution service (block 925). The security context distribution service transmits the response message to the first device (block 930), and the method 900 ends.

Figure 10:
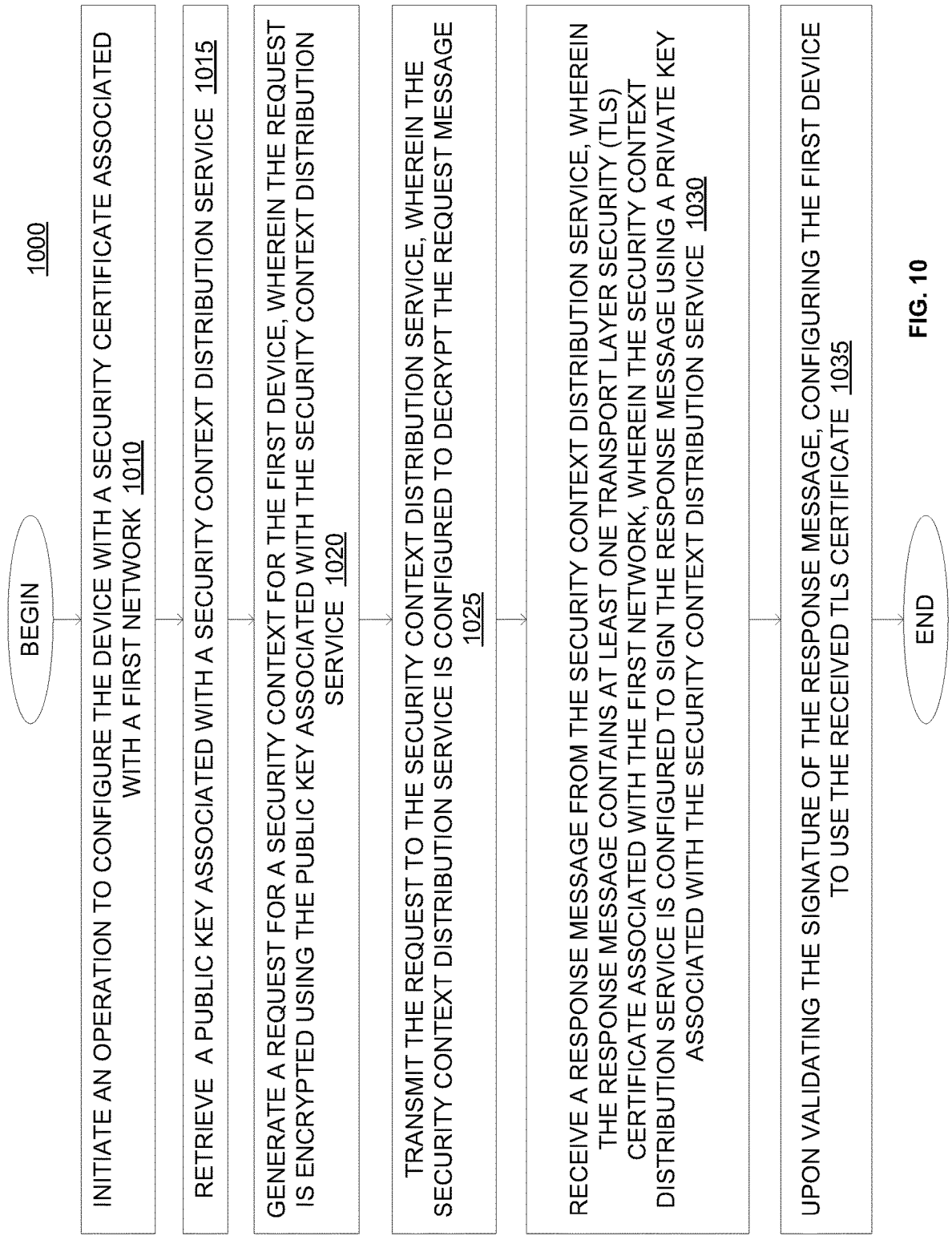
FIG. 10 is a flow diagram illustrating a method of automatically configuring a device on a network with a security certificate for the network, according to one embodiment described herein.

FIG. 10 is a flow diagram illustrating a method of automatically configuring a device on a network with a security certificate for the network, according to one embodiment described herein. The method 1000 begins at block 1010, where logic on a device initiates an operation to configure the device with a security certificate associated with a first network. The logic retrieves a public key associated with a security context distribution service (block 1015) and generates a request for a security context for the first device, where the request is encrypted using the public key associated with the security context distribution service (block 1020). The logic transmits the request to the security context distribution service, where the security context distribution service is configured to decrypt the request message (block 1025).

At some later point in time, the logic receives a response message from the security context distribution service (block 1030). In the present example, the response message contains at least one Transport Layer Security (TLS) certificate associated with the first network, and the security context distribution service is configured to sign the response message using a private key associated with the security context distribution service. The logic validates the signature of the response message, and upon successful validation, the logic configures the first device to use the received TLS certificate (block 1035) and the method 1000 ends.

Any general-purpose computer systems used in various embodiments of this disclosure may be, for example, general-purpose computers such as those based on Intel PENTIUM-type processor, Motorola PowerPC, Sun UltraSPARC, Hewlett-Packard PA-RISC processors, or any other type of processor.

Figure 11:
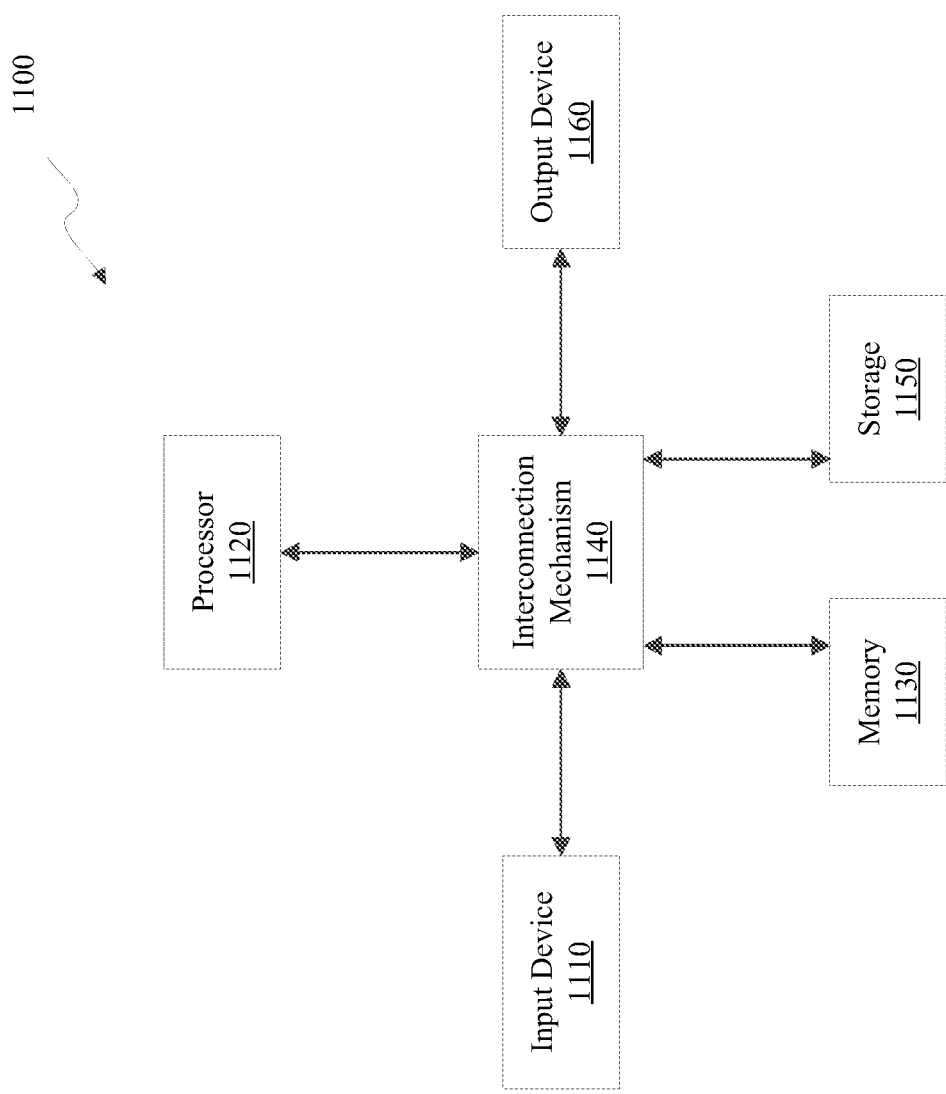
FIG. 11 illustrates a block diagram of a general-purpose computer system, according to one embodiment described herein.

For example, various embodiments of the disclosure may be implemented as specialized software executing in a general-purpose computer system 1100 such as that shown in FIG. 11. The computer system 1100 may include a processor 1120 connected to one or more memory devices 1130, such as a disk drive, memory, or other device for storing data. Memory 1130 is typically used for storing programs and data during operation of the computer system 1100. The computer system 1100 may also include a storage system 1150 that provides additional storage capacity. Components of computer system 1100 may be coupled by an interconnection mechanism 1140, which may include one or more busses (e.g., between components that are integrated within the same machine) and/or a network (e.g., between components that reside on separate discrete machines). The interconnection mechanism 1140 enables communications (e.g., data, instructions) to be exchanged between system components of system 1100.

Computer system 1100 also includes one or more input devices 1110, for example, a keyboard, mouse, trackball, microphone, touch screen, and one or more output devices 1160, for example, a printing device, display screen, speaker. In addition, computer system 1100 may contain one or more interfaces (not shown) that connect computer system 1100 to a communication network (in addition or as an alternative to the interconnection mechanism 1140).

Figure 12:
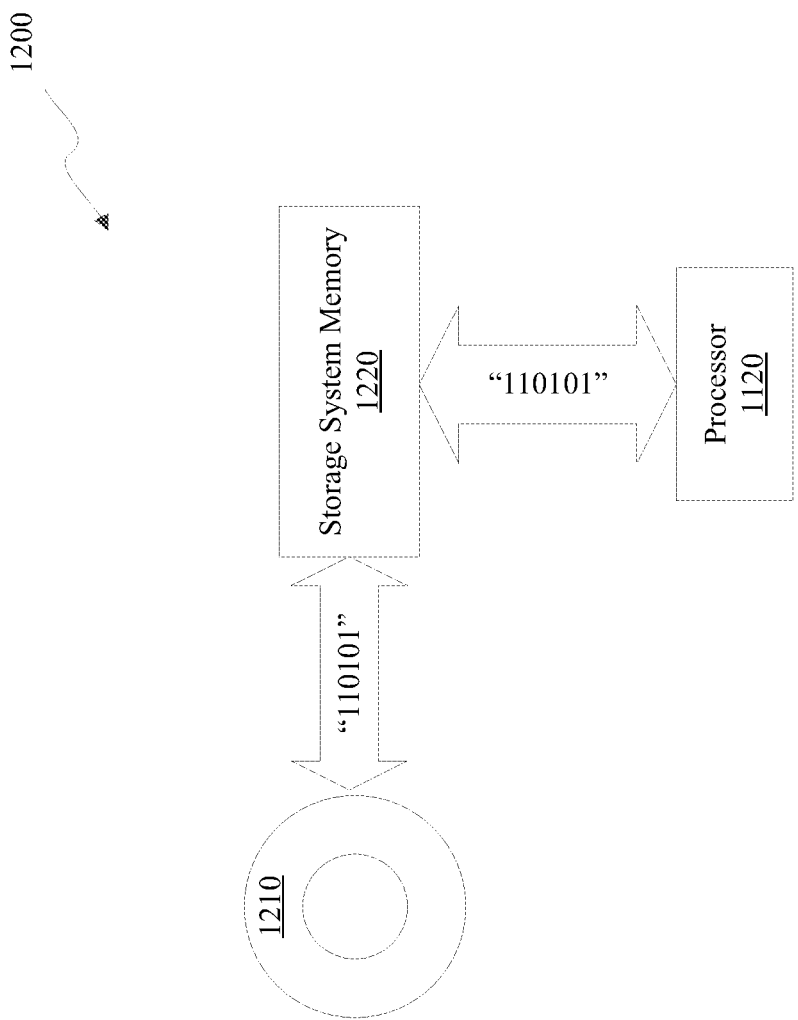
FIG. 12 illustrates a block diagram of a general-purpose storage system in accordance with the general-purpose computer system of FIG. 11.

The storage system 1150, shown in greater detail in FIG. 12, typically includes a computer readable and writeable nonvolatile recording medium 1210 in which signals are stored that define a program to be executed by the processor or information stored on or in the medium 1210 to be processed by the program to perform one or more functions associated with embodiments described herein. The medium may, for example, be a disk or flash memory. Typically, in operation, the processor causes data to be read from the nonvolatile recording medium 1210 into another memory 1220 that allows for faster access to the information by the processor than does the medium 1210. This memory 1220 is typically a volatile, random access memory such as a dynamic random-access memory (DRAM) or static memory (SRAM). It may be located in storage system 1200, as shown, or in memory system 1130. The processor 1120 generally manipulates the data within the integrated circuit memory 1130, 1220 and then copies the data to the medium 1210 after processing is completed. A variety of mechanisms are known for managing data movement between the medium 1210 and the integrated circuit memory element 1130, 1220, and the disclosure is not limited thereto. The disclosure is not limited to a particular memory system 1130 or storage system 1150.

The computer system may include specially-programmed, special-purpose hardware, for example, an application-specific integrated circuit (ASIC). Aspects of the disclosure may be implemented in software, hardware or firmware, or any combination thereof. Further, such methods, acts, systems, system elements and components thereof may be implemented as part of the computer system described above or as an independent component.

Although computer system 1100 is shown by way of example as one type of computer system upon which various aspects of the disclosure may be practiced, it should be appreciated that aspects of the disclosure are not limited to being implemented on the computer system as shown in FIG. 12. Various aspects of the disclosure may be practiced on one or more computers having a different architecture or components shown in FIG. 12. Further, where functions or processes of embodiments of the disclosure are described herein (or in the claims) as being performed on a processor or controller, such description is intended to include systems that use more than one processor or controller to perform the functions.

Computer system 1100 may be a general-purpose computer system that is programmable using a high-level computer programming language. Computer system 1100 may be also implemented using specially programmed, special purpose hardware. In computer system 1100, processor 1120 is typically a commercially available processor such as the well-known Pentium class processor available from the Intel Corporation. Many other processors are available. Such a processor usually executes an operating system which may be, for example, the Windows 95, Windows 98, Windows NT, Windows 2000, Windows ME, Windows XP, Vista, Windows 9, Windows 10, or progeny operating systems available from the Microsoft Corporation, MAC OS System X, or progeny operating system available from Apple Computer, the Solaris operating system available from Sun Microsystems, UNIX, Linux (any distribution), or progeny operating systems available from various sources. Many other operating systems may be used.

The processor and operating system together define a computer platform for which application programs in high-level programming languages are written. It should be understood that embodiments of the disclosure are not limited to a particular computer system platform, processor, operating system, or network. Also, it should be apparent to those skilled in the art that the present disclosure is not limited to a specific programming language or computer system. Further, it should be appreciated that other appropriate programming languages and other appropriate computer systems could also be used.

One or more portions of the computer system may be distributed across one or more computer systems coupled to a communications network. For example, as discussed above, a computer system that determines available power capacity may be located remotely from a system manager. These computer systems also may be general-purpose computer systems. For example, various aspects of the disclosure may be distributed among one or more computer systems configured to provide a service (e.g., servers) to one or more client computers, or to perform an overall task as part of a distributed system. For example, various aspects of the disclosure may be performed on a client-server or multi-tier system that includes components distributed among one or more server systems that perform various functions according to various embodiments of the disclosure. These components may be executable, intermediate (e.g., IL) or interpreted (e.g., Java) code which communicate over a communication network (e.g., the Internet) using a communication protocol (e.g., TCP/IP). For example, one or more database servers may be used to store device data, such as expected power draw, that is used in designing layouts associated with embodiments of the present disclosure.

It should be appreciated that the disclosure is not limited to executing on any particular system or group of systems. Also, it should be appreciated that the disclosure is not limited to any particular distributed architecture, network, or communication protocol.

Various embodiments of the present disclosure may be programmed using an object-oriented programming language, such as SmallTalk, Java, C++, Ada, or C # (C-Sharp). Other object-oriented programming languages may also be used. Alternatively, functional, scripting, and/or logical programming languages may be used, such as BASIC, ForTran, COBoL, TCL, or Lua. Various aspects of the disclosure may be implemented in a non-programmed environment (e.g., documents created in HTML, XML or other format that, when viewed in a window of a browser program render aspects of a graphical-user interface (GUI) or perform other functions). Various aspects of the disclosure may be implemented as programmed or non-programmed elements, or any combination thereof.

Embodiments of a systems and methods described above are generally described for use in relatively large data centers having numerous equipment racks; however, embodiments of the disclosure may also be used with smaller data centers and with facilities other than data centers. Some embodiments may also be a very small number of computers distributed geographically to not resemble a particular architecture.

In embodiments of the present disclosure discussed above, results of analyses are described as being provided in real-time. As understood by those skilled in the art, the use of the term real-time is not meant to suggest that the results are available immediately, but rather, are available quickly giving a designer the ability to try a number of different designs over a short period of time, such as a matter of minutes.

Having thus described several aspects of at least one embodiment of this disclosure, it is to be appreciated various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

We claim:

1. A method, comprising:
  receiving, at a security context distribution service, from a first device operating on a first network, a request for a security context for the first device, wherein the request is signed using a private key preconfigured on the first device and wherein the request is encrypted using a public key associated with the security context distribution service;
  decrypting the request and validating the request signature;
  determining a set of device requirements based on a unique identifier for the first device and device claim information associated with the first device;
  generating a response message that contains at least one Transport Layer Security (TLS) certificate associated with the first network, based on the set of device requirements, wherein the response message is encrypted using a public key associated with the first device and signed using a private key associated with the security context distribution service; and
  transmitting the response message to the first device.

2. The method of claim 1, wherein the at least one Transport Layer Security (TLS) certificate further comprises a Certificate Authority (CA) certificate.

3. The method of claim 1, wherein the generated response message further contains at least one of credentials, service tokens, and privileged endpoints.

4. The method of claim 1, wherein the request further includes the unique identifier for the first device and a cryptographically secure nonce.

5. The method of claim 1, wherein the first device is preconfigured with a private key.

6. The method of claim 5, wherein the private key is stored within a secure storage location on the first device.

7. The method of claim 1, wherein the first device is further preconfigured with a plurality of public keys, inclusive of the public key associated with the security context distribution service, and wherein the first device is configured to select the public key associated with the security context distribution service from the plurality of public keys and to encrypt the request for the security context using the selected public key.

8. The method of claim 1, wherein the first device is configured to generate and transmit the request for the security context based on at least one of (i) a first boot operation, (ii) a user command, (iii) a scheduled update and (iv) attempting to establish a secure socket connection.

9. The method of claim 1, wherein generating the response message further comprises:
  retrieving the public key associated with the first device from a repository containing a plurality of public keys, based on at least one of (i) the unique identifier for the first device and (ii) the device claim information associated with the first device.

10. The method of claim 1, wherein a public-private key pair containing the private key associated with the security context distribution service is one of a plurality of public-private key pairs preconfigured on the security context distribution service, and wherein the security context distribution service is configured to rotate usage of the public-private key pairs in the plurality of public-private key pairs according to a rotation schedule.

11. A device, comprising:
  one or more computer processors; and
  a memory containing computer program code that, when executed by operation of the one or more computer processors, performs an operation comprising:
    initiating an operation to configure the device with a security certificate associated with a first network;
    retrieving a private key that was preconfigured on the device;

generating a request for a security context for the device, wherein the request is signed using the private key and wherein the request is encrypted using a public key associated with a security context distribution service;

transmitting the request to the security context distribution service, wherein the security context distribution service is configured to decrypt the request message and validate the signature of the request message;

receiving a response message from the security context distribution service, wherein the response message contains at least one Transport Layer Security (TLS) certificate associated with the first network, wherein the security context distribution service is configured to sign the response message using a private key associated with the security context distribution service and wherein the security context distribution service is configured to encrypt the response message using a public key associated with the device; and upon decrypting the response message using the private key preconfigured on the device and validating the signature of the response message, configuring the device to use the received TLS certificate.

12. The system of claim 11, wherein the security context distribution service, in generating the response message, is configured to determine a set of device requirements for the device based on a unique identifier for the device and device claim information associated with the device, and wherein the security context distribution service is configured to generate the response message based on the set of device requirements.

13. The system of claim 11, the operation further comprising:

generating a cryptographically secure nonce; and
including the cryptographically secure nonce in the generated request for the security context.

14. The system of claim 11, wherein the device is configured to generate and transmit the request for the security context based on at least one of (i) a first boot operation, (ii) a user command, (iii) a scheduled update, and (iv) attempting to establish a secure socket connection.

15. The system of claim 11, wherein the at least one Transport Layer Security (TLS) certificate further comprises a Certificate Authority (CA) certificate, and wherein the response message further contains at least one of credentials, service tokens, and privileged endpoints.

16. A non-transitory computer-readable medium containing computer program code that, when executed by operation of one or more computer processors, performs an operation comprising:

receiving, at a security context distribution service, from a first device operating on a first network, a request for a security context for the first device, wherein the request is encrypted using a public key of the security context distribution service;

decrypting the received request using a private key associated with the security context distribution service;

determining a set of device requirements based on a unique identifier for the first device and device claim information associated with the first device;

generating a response message that contains at least one Transport Layer Security (TLS) certificate associated with the first network, based on the set of device requirements, wherein the response message is signed using the private key associated with the security context distribution service; and transmitting the response message to the first device.

17. The non-transitory computer-readable medium of claim 16, wherein the at least one Transport Layer Security (TLS) certificate further comprises a Certificate Authority (CA) certificate, and wherein the request further includes the unique identifier for the first device and a cryptographically secure nonce.

18. The non-transitory computer-readable medium of claim 16, wherein the first device is further preconfigured with the public key associated with the security context distribution service, and wherein the first device is configured to encrypt the request for the security context using the public key associated with the security context distribution service.

19. The non-transitory computer-readable medium of claim 16, wherein the first device is configured to generate and transmit the request for the security context based on at least one of (i) a first boot operation, (ii) a user command, (iii) a scheduled update and (iv) attempting to establish a secure socket connection.

20. A device, comprising:

one or more computer processors; and
a memory containing computer program code that, when executed by operation of the one or more computer processors, performs an operation comprising:

initiating an operation to configure the device with a security certificate associated with a first network;

retrieving a public key associated with a security context distribution service;

generating a request for a security context for the first device, wherein the request is encrypted using the public key associated with the security context distribution service;

transmitting the request to the security context distribution service, wherein the security context distribution service is configured to decrypt the request message;

receiving a response message from the security context distribution service, wherein the response message contains at least one Transport Layer Security (TLS) certificate associated with the first network, and wherein the security context distribution service is configured to sign the response message using a private key associated with the security context distribution service; and upon validating the signature of the response message, configuring the first device to use the received TLS certificate.

21. The device of claim 20, wherein the security context distribution service, in generating the response message, is configured to determine a set of device requirements for the first device based on a unique identifier for the first device and device claim information associated with the first device, and wherein the security context distribution service is configured to generate the response message based on the set of device requirements.

22. The device of claim 20, the operation further comprising:

generating a cryptographically secure nonce; and
including the cryptographically secure nonce in the generated request for the security context.

23. The device of claim 20, wherein the at least one Transport Layer Security (TLS) certificate further comprises a Certificate Authority (CA) certificate, and wherein the device is configured to generate and transmit the request for the security context based on at least one of (i) a first boot operation, (ii) a user command, (iii) a scheduled update, and (iv) attempting to establish a secure socket connection.

* * * * *